United States Patent [19]
Thompson

[11] Patent Number: 6,050,202
[45] Date of Patent: Apr. 18, 2000

[54] STORAGE DIVIDER SHELF

[75] Inventor: Joseph M. Thompson, Holland, Mich.

[73] Assignee: Prince Corporation, Holland, Mich.

[21] Appl. No.: 09/120,907

[22] Filed: Jul. 22, 1998

[51] Int. Cl.[7] .................................................. A47B 37/00
[52] U.S. Cl. ........................ 108/44; 224/553; 224/542; 296/37.16; 108/144.11
[58] Field of Search ...................... 224/542, 549, 224/553, 311, 282, 200; 108/145, 147, 144.11, 44, 138; 414/462, 465; 296/37.16, 37.14

[56] References Cited

U.S. PATENT DOCUMENTS

| 69,397 | 10/1867 | Briggs . |
|---|---|---|
| 693,654 | 2/1902 | Kimball . |
| 728,749 | 5/1903 | McCord . |
| 2,320,614 | 6/1943 | Kleine . |
| 2,767,896 | 10/1956 | Beck . |
| 2,778,517 | 1/1957 | Weinstein et al. . |
| 2,889,097 | 6/1959 | Broehl . |
| 2,953,287 | 9/1960 | Werner . |
| 3,110,429 | 11/1963 | Phillips . |
| 3,132,781 | 5/1964 | Poczatek . |
| 3,406,999 | 10/1968 | Kozicki . |
| 4,455,948 | 6/1984 | Torres . |
| 4,473,250 | 9/1984 | Truex et al. . |
| 4,576,329 | 3/1986 | Wright et al. . |
| 4,604,022 | 8/1986 | Bourgraf . |
| 4,962,709 | 10/1990 | Huber . |
| 4,969,793 | 11/1990 | Pawl . |
| 5,324,089 | 6/1994 | Schlachter . |
| 5,372,289 | 12/1994 | Dachicourt . |
| 5,427,033 | 6/1995 | Bly ............................................. 108/44 |
| 5,669,537 | 9/1997 | Saleem et al. . |
| 5,771,815 | 6/1998 | Leftwich .................................. 108/44 |

FOREIGN PATENT DOCUMENTS 2619063  2/1989  France .

*Primary Examiner*—Peter M. Cuomo
*Assistant Examiner*—Gerald A. Anderson
*Attorney, Agent, or Firm*—Price, Heneveld, Cooper, DeWitt & Litton

[57] ABSTRACT

A storage divider includes a first frame which has one edge pivotally mounted to the floor of the vehicle and a second frame pivotally mounted to the first frame member remote from its connection to the vehicle floor. Together the frames move from a co-planar collapsed stored position to a raised position elevating a storage platform positioned on the second frame above the floor area of the vehicle while leaving the floor area of the vehicle open for additional storage. In a preferred embodiment of the invention, the second frame includes one edge with extensions which hook into sockets mounted to the sidewalls of the vehicle for holding the storage divider in an extended use position. In one embodiment also, the platform mounted to the second frame can be a collapsible, segregated storage divider for providing additional horizontally divided storage spaces elevated above the vehicle floor when the divider is in an extended use position or at the floor level of the vehicle when the divider is in its collapsed position.

22 Claims, 4 Drawing Sheets

STORAGE DIVIDER SHELF

BACKGROUND OF THE INVENTION

The present invention relates to a movable storage shelf for use in a vehicle for selectively dividing a vehicle storage area into vertically segmented compartments.

With the recent popularity of mini vans, hatchbacks and other vehicles which have relatively large vertical storage areas with little confinement of packages placed therein, there exists a need for a system in which, when needed, the significant vertical storage area can be more efficiently employed. In the past, there has been proposed a variety of removable slide-in shelves which fit within tracks along the sides of a vehicle for such purpose, however, the use and storage of such shelves is cumbersome at best. There also remains a need for an inexpensive, durable, easy-to-use and compact storage system for dividing the storage area of a vehicle into vertically segmented areas and one which can be selectively and easily moved into and out of position without requiring removal from the vehicle or specialized storing areas.

SUMMARY OF THE PRESENT INVENTION

The system of the present invention provides such a system in which a first frame has one edge pivotally mounted to the floor of the vehicle and a second frame member pivotally mounted to the first frame member remote from its connection to the vehicle floor. Together the frames can be moved from a co-planar collapsed stored position to a raised position elevating a storage platform positioned on the second frame above the floor area of the vehicle while leaving the floor area of the vehicle open for additional storage. In a preferred embodiment of the invention, the second frame includes one edge with extensions which hook into sockets mounted to the sidewalls of the vehicle for holding the storage divider in an extended use position. In one embodiment also, the platform mounted to the second frame can be a collapsible, segregated storage divider for providing additional horizontally divided storage spaces elevated above the vehicle floor when the divider is in an extended use position or at the floor level of the vehicle when the divider is in its collapsed position. Thus, with the system of the present invention, the rear storage area of a vehicle, such as a mini van, hatchback or the like, is more efficiently utilized by dividing the space into vertically and horizontally divided storage areas to fully utilize the volume of space available for storage of a variety of items of different sizes.

These and other features, objects and advantages of the present invention will become apparent upon reading the following description thereof together with reference to the accompanying drawings.

DETAILED DESCRIPTION OF THE PREFERRED EMBODIMENT

Figure 1:
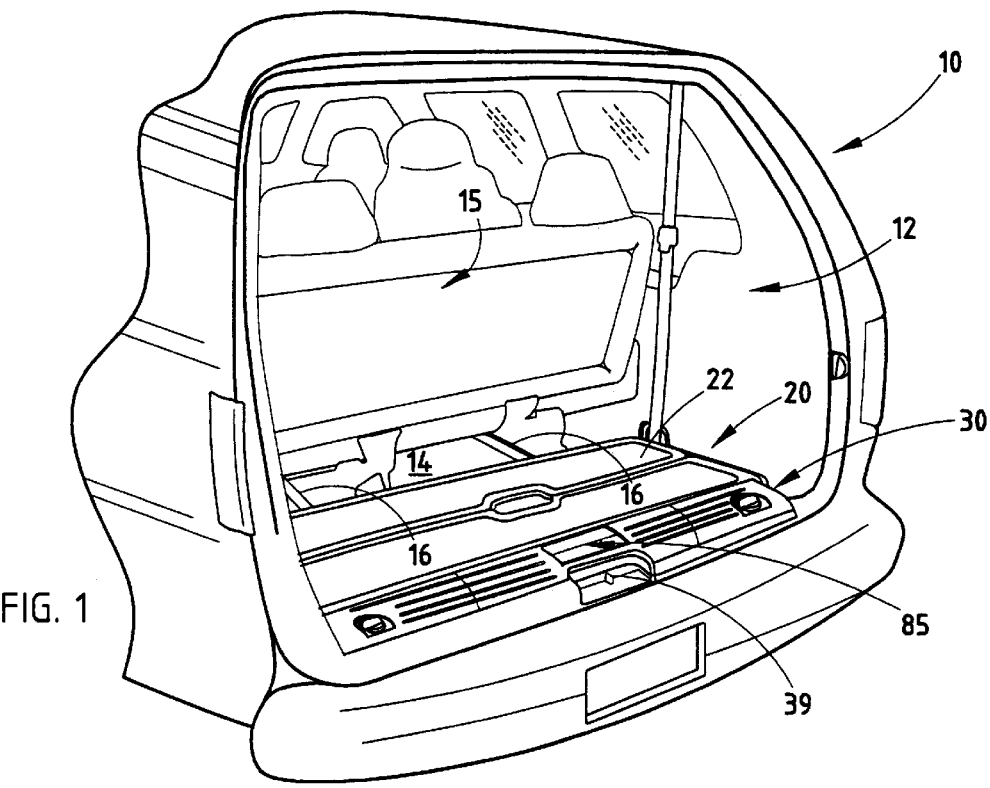
FIG. 1 is a fragmentary perspective view of a mini van incorporating a storage divider of the present invention, shown in a collapsed, stored position.
Figure 2:
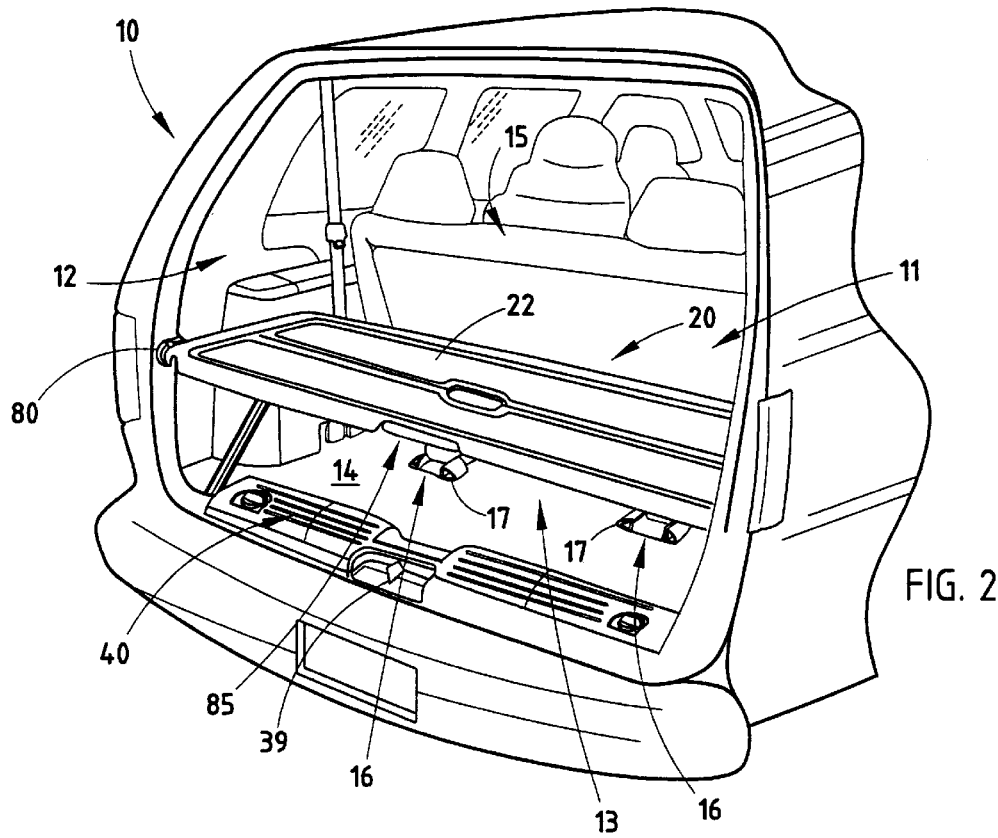
FIG. 2 is a fragmentary perspective view of the structure shown in FIG. 1, taken from the opposite side of the vehicle and showing the storage divider in an extended first use position.

Referring initially to FIGS. 1 and 2, there is shown a vehicle 10 such as a mini van, hatchback or other vehicle having a rear cargo area which is accessible, typically through a tailgate or hatchback cover door (not shown). The cargo area 12, shown in FIGS. 1 and 2, is a relatively large area with significant vertical space which typically is not easily used with normal packages, such as grocery bags and the like. In order to more efficiently utilize the space, a shelf divider assembly 20 of the present invention is installed within the vehicle and can move from a collapsed stored position, as shown in FIG. 1, in which the floor or upper surface 22 of the storage divider is substantially flush with the floor 14 of the vehicle and an elevated, extended position, as illustrated in FIG. 2, where the floor 22 of the shelf divider assembly 20 is elevated above floor 14 of the vehicle. In this position, the assembly 20 provides segregated storage spaces 11 above the shelf and 13 under the shelf, thereby more efficiently utilizing the rear cargo area 12 which includes both vertically spaced storage areas 11 and 13.

Figure 3:
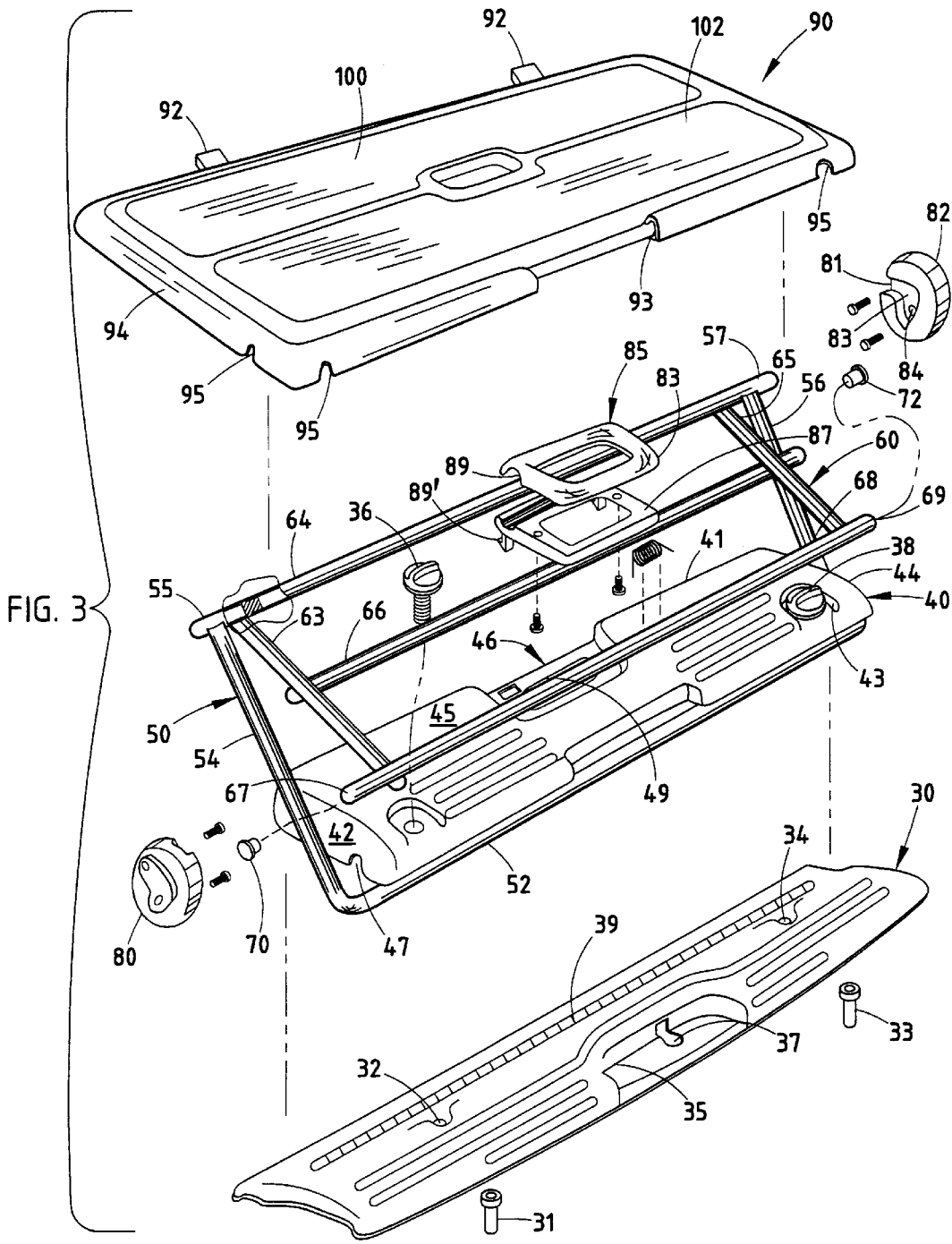
FIG. 3 is an exploded perspective view of the storage divider shown in FIGS. 1 and 2 removed from the vehicle for showing the individual components.
Figure 4:
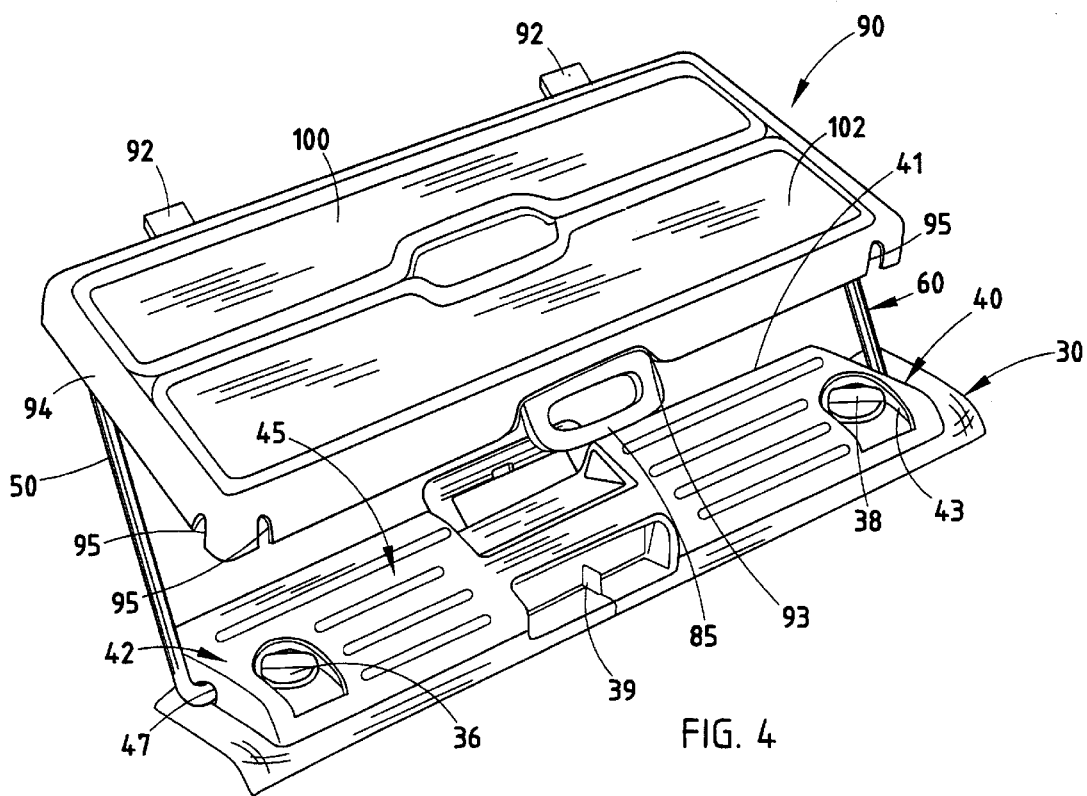
FIG. 4 is a perspective assembled view of the storage divider shown in FIGS. 1-3.

The vehicle 10 typically includes a rear bench-type seat 15 mounted on a pair of parallel spaced tracks 16 which, as described in greater detail below, include sockets 17 for receiving tabs of the storage shelf 20 when in a lowered position, as seen in FIG. 1. The dividing storage shelf assembly 20 is best seen in FIG. 3 and includes a first trim member 30 which extends substantially the width of the vehicle and is secured to the rear edge of the cargo area 12, as also seen in FIGS. 1 and 2, by means of a pair of apertures 32, 34 and a pair of threaded fasteners 36, 38 which extend through a second trim member 40 partially overlying first trim member 30 as best seen in FIG. 4. The threaded fasteners 36, 38 have relatively large flanged knobs to allow the vehicle operator to remove the storage shelf divider if desired. The threaded ends of fasteners 36, 38 are received by blind threaded anchor fasteners 31, 33 secured to the floor of the vehicle and which seal the interior of the vehicle from the outside environment, including exhaust gases which may be in the area of the rear deck of the vehicle.

The generally rectangular molded first trim member 30 includes a recess 35 (FIG. 3) which includes an aperture 37 allowing the vehicle rear door to latch to its normal locking member 39 (FIGS. 1 and 2) so the shelf divider does not interfere with the normal operation of the rear door of the vehicle. The second trim member 40 is also generally rectangular and is also a hollow molded shell which includes a pair of recesses 41, 43 for receiving the hand-operated fasteners 36, 38 in recessed relationship to the curvilinear upper surface 45 of trim member 40, as best seen in FIGS. 1, 2 and 4. Trim member 40 includes end walls 42, 44, each of which include a semicylindrical recess 47 for captively and rotatably receiving one leg 52 of a first generally rectangular tubular frame member 50 to allow frame member 50 to rotate between a lowered position as seen in FIG. 1 and an elevated position seen in FIGS. 2 and 4. Leg 52 is captively held within elongated semicylindrical socket 39 formed in the top surface of member 30.

Frame member 50 is generally rectangular including the first leg 52 which extends horizontally substantially the width of the rear cargo area of the vehicle. A pair of side legs 54, 56 which include inwardly turned ends 55, 57 which pivotally receive a transversely extending leg 64 of a second frame member 60 having an intermediate transversely extending leg 66 and a rear transversely extending leg 68 with outwardly projecting tips 67 and 69 which are capped by polymeric plugs 70 and 72 to finish the tubular frame member 60. Ends 67, 69 are removably and lockably fitted within sockets 80, 82 mounted to the sidewall of the vehicle 10 as best seen in FIG. 2 for hooking the trailing edge of frame member 60 into a raised position as shown in FIG. 2. For such purpose, the sockets 80, 82 each include a generally L-shaped slot 83 having a width sufficient to receive the ends 67, 69 of the cross member 68 which are inserted into the entry opening 81 and subsequently into the lower end 84 of each of the sockets 80 and 82 for locking the frame and shelf 90 attached to the second frame member 60 in a raised position, as seen in FIG. 2.

The first frame 50, therefore, is pivotally mounted to the floor of a vehicle by the captive and rotatable mounting between the second trim member 40 and the first trim member 30 which is secured to the floor of the vehicle itself. The second frame 60 is pivotally mounted to the opposite end of the first frame member such that the two frame members can move from a collapsed position in which cross member 68 of the second frame is positioned forwardly (in the vehicle) of the forward edge of second trim member 40 when in a stored position as seen in FIG. 1. Thus, end legs 63, 65 coupling cross legs 62, 66 and 68 have a length with respect to the length of legs 54 and 56 of first frame 50 to allow such nested collapsed relationship. Frame 60 can be pivotally mounted to frame 50 in any number of ways including utilizing coaxially mounted tubes, stub axles extending from either ends 55, 57 into hollow tube 64, or by other conventional means allowing a pivot connection between the ends of legs 54, 56 and cross member 64.

The second trim member 40 includes a recess 46 at its forward end for lockably receiving a handle latch 85 which is secured to cross member 68 and which extends within recess 46 for easy access for raising the assembly 20 from the position seen in FIG. 1 to the elevated position shown in FIG. 2. For such purpose, the handle 85 may be a split polymeric handle having a first section 83 and a second section 87, each with semicylindrical recesses 89 for surrounding cross member 68 and be rotatable therearound to move from a locked position to a released position. The locking handle 85 preferably includes at least a pair of downwardly projecting locking tabs 89 which engages an edge of an aperture 49 in recess 46 for locking the shelf divider 20 in the lowered position shown in FIG. 1.

Figure 5:
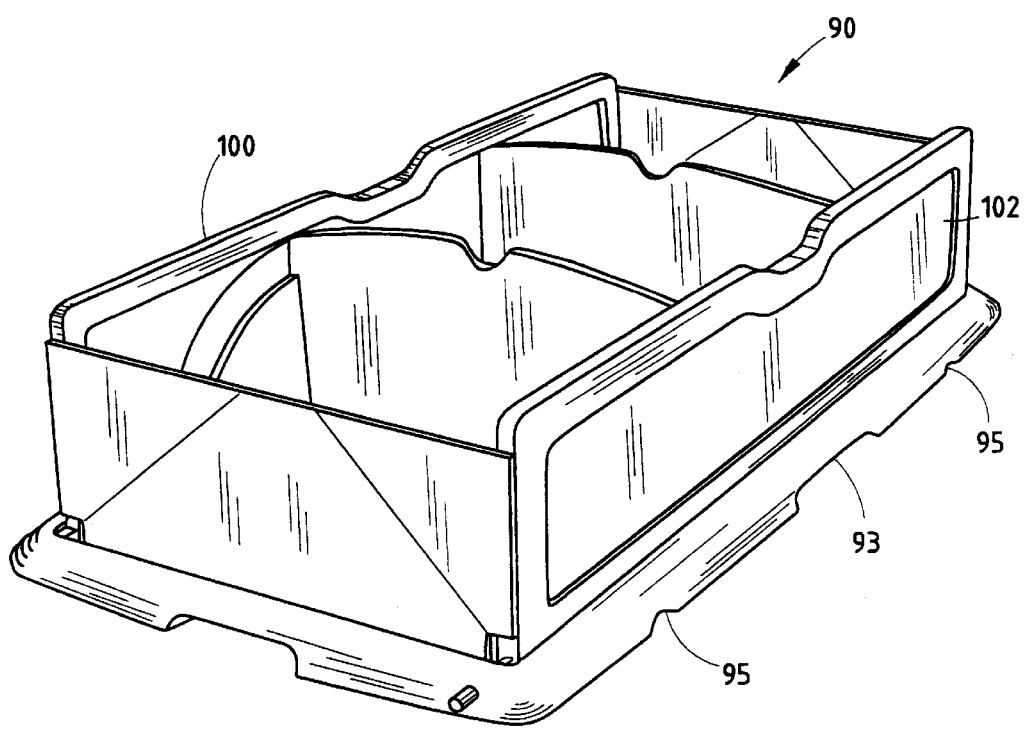
FIG. 5 is a view of the support shelf of the storage divider of the present invention shown in an expanded storage dividing position.

Mounted to the upper frame 60 is a shelf 90 which can be a planar, solid shelf having a pair of spaced forwardly projecting tabs 92 which fit within apertures 17 of the track 16 in the floor of the vehicle when the unit is in a stored position for holding the storage dividing shelf unit 20 in the lowered position seen in FIG. 1. Shelf 90 includes a slot 93 for providing clearance for the locking handle 85 as well as notches 95 around its peripheral lip 94 for providing clearance for cross member 68 and side legs 54, 56 when in a collapsed position. Although the shelf 90 may be a solid shelf without moving parts, preferably it is a collapsible storage box comprising a pair of end walls 100 and 102 which can be expanded, as shown in FIG. 5 and as described in greater detail in U.S. patent application Ser. No. 08/814, 653 entitled TRUNK STORAGE DIVIDER, filed on Mar. 11, 1997, the disclosure of which is incorporated herein by reference, to provide a horizontally divided storage unit which can be elevated above the floor 14 of the cargo area 12 of vehicle 10.

The first and second trim members 20 and 30, respectively, together define a mounting bracket for the first frame 40 and can be integrally molded of any suitable polymeric material. Such material includes, for example, resin-filled polypropylene, ABS, glass-filled polypropylene or other suitable structural polymeric material which provides decorative and structural members for supporting frames 40 and 60. Frames 40 and 60 are generally made of hollow tubes which can be powder-coated steel or anodized aluminum sections suitably welded or otherwise conventionally coupled in the configuration shown to provide rigid frame members which are pivotally coupled to each other and coupled to the floor of the vehicle through the trim members 20 and 30. Similarly, the shelf 90 can also be made of a suitable resin or glass-filled polypropylene, ABS or other polymeric material for providing the desired rigidity, strength and appearance to the storage unit.

It will become apparent to those skilled in the art that various modifications to the preferred embodiments of the invention as described herein can be made without departing from the spirit or scope of the invention as defined by the appended claims.

The invention claim is:

1. A storage divider shelf for a vehicle comprising:

a first generally rectangular frame having a longitudinal axis and first and second generally parallel spaced-apart edges extending along said longitudinal axis;

a bracket for mounting said first edge of said first frame in pivotal relationship to a vehicle floor and extending transversely to the vehicle;

a second generally rectangular frame having a longitudinal axis and first and second generally parallel spaced-apart edges extending along said longitudinal axis, said second edge of said second frame pivotally mounted to said second edge of said first frame such that said first and second frames can collapse to a substantially horizontal stored position and pivotally extend to a raised position with said first edge of said second frame spaced from said first edge of said first frame when in a raised use position; and a storage structure mounted to said second frame member for supporting objects to be stored thereon when in said stored position and when in said use position, said second frame defining an open space between said first edge of said first frame and said second frame when in said use position for storing objects between said frames.

2. A storage divider shelf for a vehicle comprising:

a first frame having first and second generally parallel spaced-apart edges;

a bracket for mounting said first edge of said first frame in pivotal relationship to a vehicle floor;

a second frame having first and second generally parallel spaced-apart edges, said second edge of said second frame pivotally mounted to said second edge of said first frame such that said first and second frames can collapse to a substantially horizontal stored position and pivotally extend to a raised position with said first edge of said second frame spaced from said first edge of said first frame when in a raised use position, wherein said first edge of said second frame includes at least one extension thereof and further including a socket adapted to be mounted to a vehicle support member in orthogonal relationship to said bracket, said socket receiving said extension of said first end of said second frame for locking said divider shelf in a raised use position; and a storage structure mounted to said second frame member for supporting objects to be stored thereon.

3. The divider shelf as defined in claim 2 wherein said first and second frames are made of tubular material.

4. The divider shelf as defined in claim 3 wherein said first frame comprises a generally U-shaped frame having a cross leg defining said first edge and a pair of ends remote from said first leg defining said second edge.

5. The divider shelf as defined in claim 4 wherein said second frame member comprises a generally rectangular frame made of tubular members.

6. The divider shelf as defined in claim 5 wherein said first edge of said second frame is defined by a tubular member extending laterally beyond the edges of the rectangle defined by said first frame.

7. The divider shelf as defined in claim 6 wherein said storage structure comprises a support shelf.

8. The divider shelf as defined in claim 6 wherein said storage structure comprises a collapsible storage compartment.

9. The divider shelf as defined in claim 8 wherein said socket comprises a generally disk-shaped member having an inverted L-shaped groove formed therein for receiving an extending end of said tubular member defining said first edge of said second frame.

10. The divider shelf as defined in claim 9 and further including a locking handle mounted to said second frame for selectively engaging said mounting bracket for locking said storage divider shelf in a collapsed position.

11. A storage divider shelf for a vehicle comprising:

a first frame having first and second generally parallel spaced-apart edges;

a bracket for mounting said first edge of said first frame in pivotal relationship to a vehicle floor;

a second frame having first and second generally parallel spaced-apart edges, said second edge of said second frame pivotally mounted to said second edge of said first frame such that said first and second frames can collapse to a substantially horizontal stored position and pivotally extend to a raised position with said first edge of said second frame spaced from said first edge of said first frame when in a raised use position, wherein said mounting bracket comprises a pair of panels with a first one of said panels attachable to a floor of a vehicle and the second of said panels captively and pivotally holding said first frame to said first panel; and a storage structure mounted to said second frame member for supporting objects to be stored thereon.

12. The divider shelf as defined in claim 11 and further including threaded fasteners for holding said first and second panels together and to a vehicle floor.

13. The divider shelf as defined in claim 12 wherein said threaded fasteners include hand-operated knobs to allow a user to easily remove said divider shelf from a vehicle.

14. The divider shelf as defined in claim 13 wherein said panels are generally rectangular molded polymeric trim panels.

15. A storage divider for a vehicle comprising:

a first member having first and second spaced-apart generally parallel edges;

a bracket for mounting said first edge of said first member in pivotal relationship to a vehicle floor;

a second member having first and second spaced-apart generally parallel edges, said second member pivotally mounted to said first member such that said first and second members can collapse to a substantially horizontal stored position and pivotally extend to a raised position with said second member generally parallel to and spaced above the vehicle floor; and a collapsible storage bin mounted to said second member for supporting objects to be stored therein.

16. The storage divider as defined in claim 15 wherein said first and second members are tubular frames.

17. A storage divider for a vehicle comprising:

a first member having first and second spaced-apart generally parallel edges;

a bracket for mounting said first edge of said first member in pivotal relationship to a vehicle floor;

a second member having first and second spaced-apart generally parallel edges, said second member pivotally mounted to said first member such that said first and second members can collapse to a substantially horizontal stored position and pivotally extend to a raised position with said second member generally parallel to and spaced above the vehicle floor, wherein said first and second members are tubular frames, and wherein said second member includes at least one extension thereof and further including a socket adapted to be mounted to a vehicle support member in orthogonal relationship to and spaced above the floor, said socket receiving said extension of said first end of said second member for locking said shelf in a raised use position; and a storage shelf mounted to said second member for supporting objects to be stored thereon.

18. The storage divider as defined in claim 17 wherein said storage shelf comprises a collapsible storage compartment.

19. A storage divider shelf for vertically dividing the storage area of a vehicle comprising:

a shelf for storing objects thereon; and first and second frames made of tubular material, said frames having edges pivotally coupled to one another and one of said frames having an opposite edge pivotally mounted to the vehicle floor, wherein said second frame includes an end extending laterally beyond the edges of the rectangle defined by said frames and further including a socket adapted to be mounted to a vehicle support member in orthogonal relationship to said bracket, said socket receiving said extension of said first end of said second frame for locking said divider shelf in a raised use position for movement between a lowered position adjacent the vehicle floor and a raised position spaced above the vehicle floor for providing storage on said shelf above the vehicle floor and on the vehicle floor below said shelf.

20. The divider shelf as defined in claim 19 wherein said storage shelf comprises a collapsible storage compartment.

21. The divider shelf as defined in claim 20 wherein said socket comprises a member having an inverted L-shaped groove formed therein for receiving the extending end of said second frame.

22. The divider shelf as defined in claim 20 and further including a locking handle mounted to said second frame for selectively locking said storage divider shelf in a collapsed position.

* * * * *